United States Patent
Yang

(10) Patent No.: US 7,715,184 B2
(45) Date of Patent: May 11, 2010

(54) NOTEBOOK AND ASSEMBLING AND DISSEMBLING MECHANISM FOR DATA STORAGE DEVICE THEREOF

(75) Inventor: Wei-Te Yang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 117 days.

(21) Appl. No.: 12/168,106

(22) Filed: Jul. 5, 2008

(65) Prior Publication Data
US 2009/0027848 A1 Jan. 29, 2009

(30) Foreign Application Priority Data
Jul. 26, 2007 (TW) ............................... 96127217 A

(51) Int. Cl.
G06F 1/16 (2006.01)
(52) U.S. Cl. ........................... 361/679.37; 361/679.39; 361/379.58; 361/727
(58) Field of Classification Search ............ 361/679.39, 361/679.58, 727
See application file for complete search history.

(56) References Cited
U.S. PATENT DOCUMENTS

2006/0245160 A1* 11/2006 Zhang et al. ................. 361/685
2006/0291159 A1* 12/2006 Jiang et al. .................. 361/685
2007/0002002 A1* 1/2007 Jiang et al. .................. 345/102
2007/0035922 A1* 2/2007 Jiang et al. .................. 361/685
2007/0053148 A1* 3/2007 Shi et al. ..................... 361/684
2007/0274034 A1* 11/2007 Yang et al. .................. 361/685
2009/0273901 A1* 11/2009 Jaramillo et al. ....... 361/679.58

* cited by examiner

Primary Examiner—Jayprakash N Gandhi
Assistant Examiner—Anthony Q Edwards
(74) Attorney, Agent, or Firm—Jianq Chyun IP Office

(57) ABSTRACT

An assembling and dissembling mechanism for a data storage device suited to assemble and disassemble a data storage device in a casing having an opening includes a fastener having a connecting portion and a first fastening portion and a push button slidingly disposed at the opening of the casing. The connecting portion is fixed at the data storage device and is connected to the first fastening portion. The push button has a second fastening portion and a pushing portion which are disposed in the casing. The second fastening portion is suitable to be fastened with the first fastening portion to install the data storage device in the casing. When the push button slides by a predetermined distance, it drives the second fastening portion to be separated from the first fastening portion, and the pushing portion pushes the first fastening portion to disassemble the data storage device.

16 Claims, 12 Drawing Sheets

NOTEBOOK AND ASSEMBLING AND DISSEMBLING MECHANISM FOR DATA STORAGE DEVICE THEREOF

CROSS-REFERENCE TO RELATED APPLICATION

This application claims the priority benefit of Taiwan application serial no. 96127217, filed on Jul. 26, 2007. The entirety of the above-mentioned patent application is hereby incorporated by reference herein and made a part of this specification.

BACKGROUND OF THE INVENTION

1. Field of the Invention

The invention relates to an assembling and disassembling mechanism and, more particularly, to an assembling and disassembling mechanism for a data storage device of a notebook.

2. Description of the Related Art

With the development of the science and technology, people become more dependent on the electronic device day by day. The portable electronic device is light, slim, short and small, and therefore, it is loved by the consumer gradually. To lighten the portable electronic device to facilitate the carry or repair, the portable electronic device usually has a detachable device such as a data storage device like the floppy disc drive, hard disk drive, optical disc drive or recorder.

FIG. 1A to FIG. 1C are schematic diagrams showing the assembly flow path of the optical disc drive of the conventional notebook. First, as shown in FIG. 1A, four screws 120 are used to screw a bracket 110 to the body of an optical disc drive 100. Afterward, as shown in FIG. 1B, the optical disc drive 100 is pushed into the lower casing 200 of the notebook to allow the connector 102 of the optical disc drive 100 to connect with the connector 220 of the circuit board 210 on the lower casing 200. At last, as shown in FIG. 1C, the screws 130 are used to screw the optical disc drive 100 to the lower casing 200, and then some parts assembled to the optical disc drive 10 are used to fix the optical disc drive 100 on the lower casing 200.

However, when the optical disc drive 100 is repaired or replaced, the parts assembled to the optical disc drive 100 should be removed first, and the optical disc drive 100 should be unlocked with the lower casing 200. Thus, the optical disc drive 100 is taken out of the lower casing 200. In this way, the assembly speed of the optical disc drive 100 decreases, and complexity of assembly or disassembly increases.

BRIEF SUMMARY OF THE INVENTION

The invention provides an assembling and dissembling mechanism for a data storage device. The data storage device is mainly fastened to the casing of the notebook. Thus, the data storage device may be assembled or dissembled without any tools to facilitate the assembly and disassembly of the data storage device.

The invention provides an assembling and dissembling mechanism for a data storage device, which is suitable to assemble a data storage device to or disassemble the data storage device from a casing. The casing has an opening. The assembling and dissembling mechanism for a data storage device includes a fastener and a push button. The fastener has a connecting portion and a first fastening portion. The connecting portion is fixed at the data storage device and is connected to the first fastening portion. The push button is slidingly disposed at an opening of the casing. One portion of the push button is exposed from the opening, and the push button may slides by a predetermined distance in the opening. The push button has a second fastening portion and a pushing portion which are disposed in the casing. The second fastening portion is suitable to be fastened with the first fastening portion to install the data storage device at the casing. When the push button slides by the predetermined distance, it drives the second fastening portion to be separated from the first fastening portion, and the pushing portion pushes the first fastening portion to disassemble and push the data storage device.

In one embodiment of the invention, the data storage device is slidingly disposed at the casing along a first sliding direction. Furthermore, the push button slides by the predetermined distance along a second sliding direction perpendicular to the first sliding direction in substance.

In one embodiment of the invention, the first fastening portion is a fastening notch, and the second fastening portion is a hook corresponding to the fastening notch.

In one embodiment of the invention, the first fastening portion is a plate, and the second fastening portion is a hook suitable to hook the edge of the plate.

In one embodiment of the invention, the first fastening portion has an oblique portion. When the push button slides by the predetermined distance, the pushing portion pushes the oblique portion to push the data storage device.

In one embodiment of the invention, the push button further includes a plurality of sliding rails corresponding to the edges of the opening to allow the push button to slide in the opening of the casing along the sliding rails.

In one embodiment of the invention, the portion of the push button which is exposed outside the casing further includes a plurality of protrudent ribs.

The invention further provides a notebook computer including a casing, a data storage device, a fastener and a push button. The casing has an opening. The data storage device is suitable to be assembled to or disassembled from a casing. The fastener has a connecting portion and a first fastening portion. The connecting portion is fixed at the data storage device and is connected to the first fastening portion. The push button is slidingly disposed at an opening of the casing. One portion of the push button is exposed from the opening, and the push button may slide by a predetermined distance in the opening. The push button has a second fastening portion and a pushing portion which are disposed in the casing. The second fastening portion is suitable to be fastened with the first fastening portion to install the data storage device to the casing. When the push button slides by the predetermined distance, it drives the second fastening portion to be separated from the first fastening portion, and the pushing portion pushes the first fastening portion to disassemble and move the data storage device.

In one embodiment of the invention, the data storage device is slidingly disposed at the casing along a first sliding direction. Furthermore, the push button slides by the predetermined distance along a second sliding direction perpendicular to the first sliding direction in substance.

In one embodiment of the invention, the first fastening portion is a fastening notch, and the second fastening portion is a hook corresponding to the fastening notch.

In one embodiment of the invention, the first fastening portion is a plate, and the second fastening portion is a hook suitable to hook the edge of the plate.

In one embodiment of the invention, the first fastening portion has an oblique portion. When the push button slides by the predetermined distance, the pushing portion pushes the oblique portion to push the data storage device.

In one embodiment of the invention, the push button further includes a plurality of sliding rails corresponding to the edges of the opening to allow the push button to slide in the opening of the casing along the sliding rails.

In one embodiment of the invention, the portion of the push button which is exposed outside the casing further includes a plurality of protrudent ribs.

For the assembling and dissembling mechanism for a data storage device, the fastener fixed to the data storage device is used to fasten with the push button, and then, the data storage device is fixed at the casing of the notebook. When the data storage device needs to be disassembled from the casing, a user only needs to disassemble the fastener from the push button. Thus, the data storage device may be assembled or disassembled without any tools to facilitate the assembly and disassembly of the data storage device.

These and other features, aspects, and advantages of the present invention will become better understood with regard to the following description, appended claims, and accompanying drawings.

DETAILED DESCRIPTION OF THE EMBODIMENTS

Figure 1A:
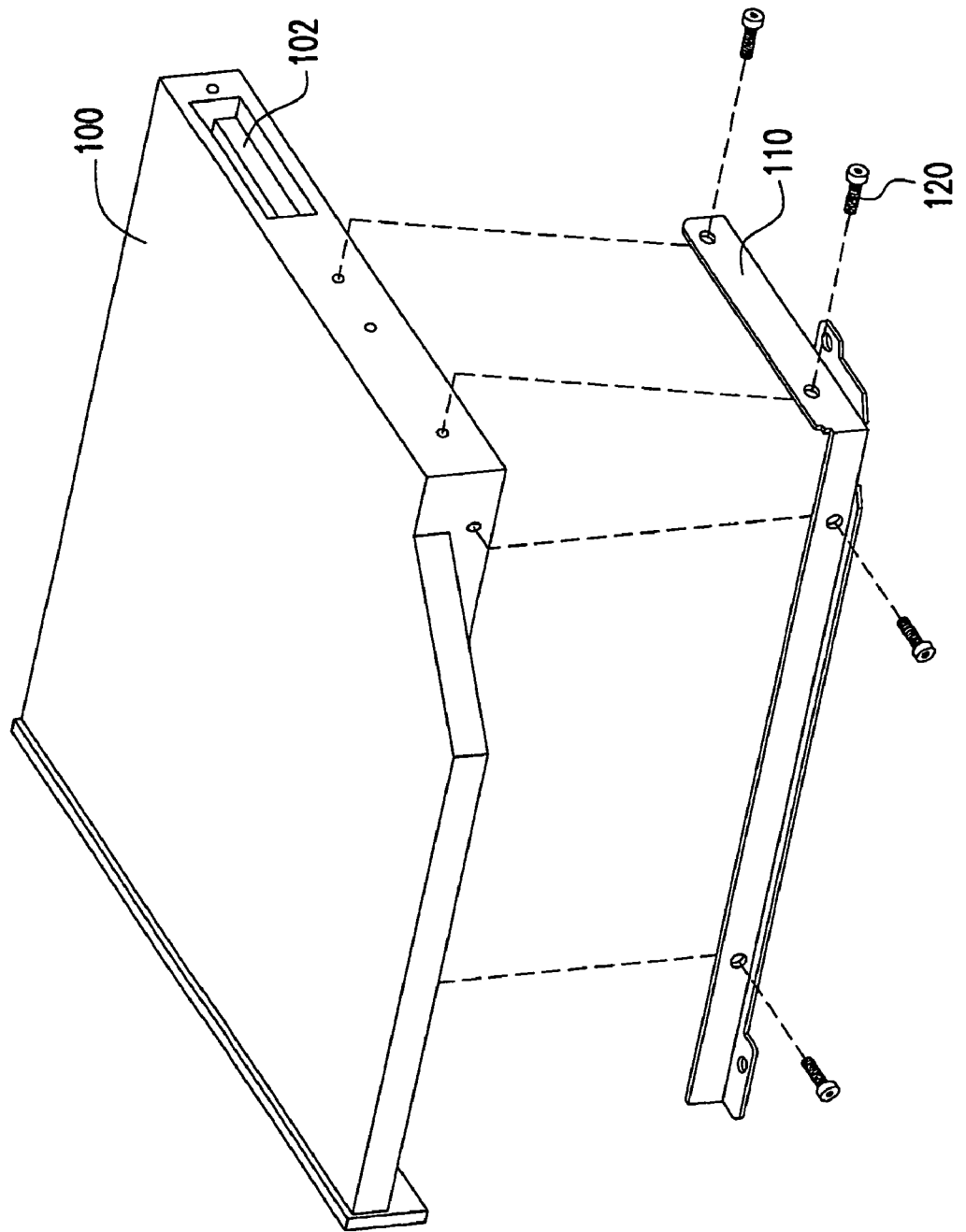
FIG. 1A to FIG. 1C are schematic diagrams showing the assembly flow path of the optical disc drive of the conventional notebook.
Figure 1B:
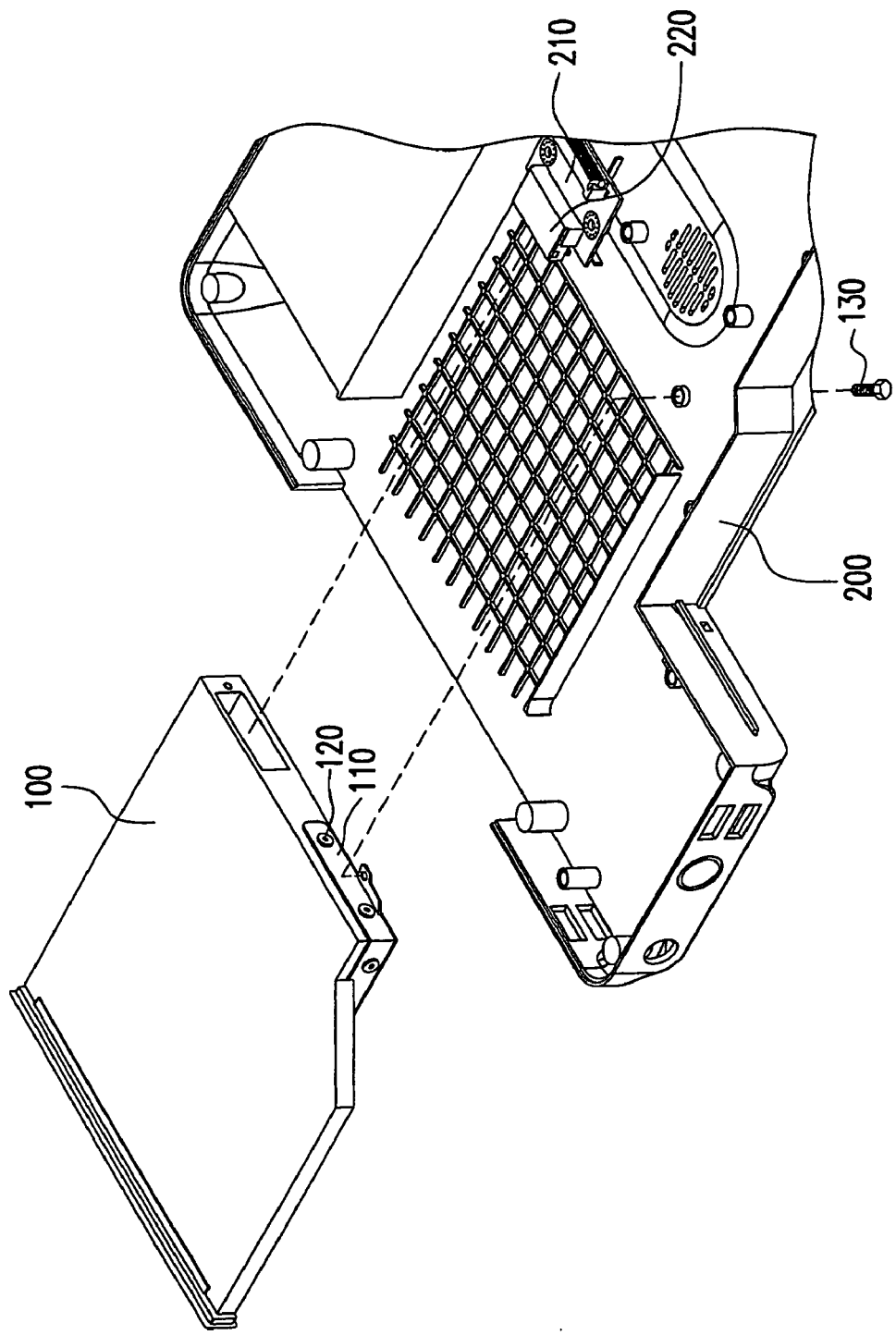
Figure 1C:
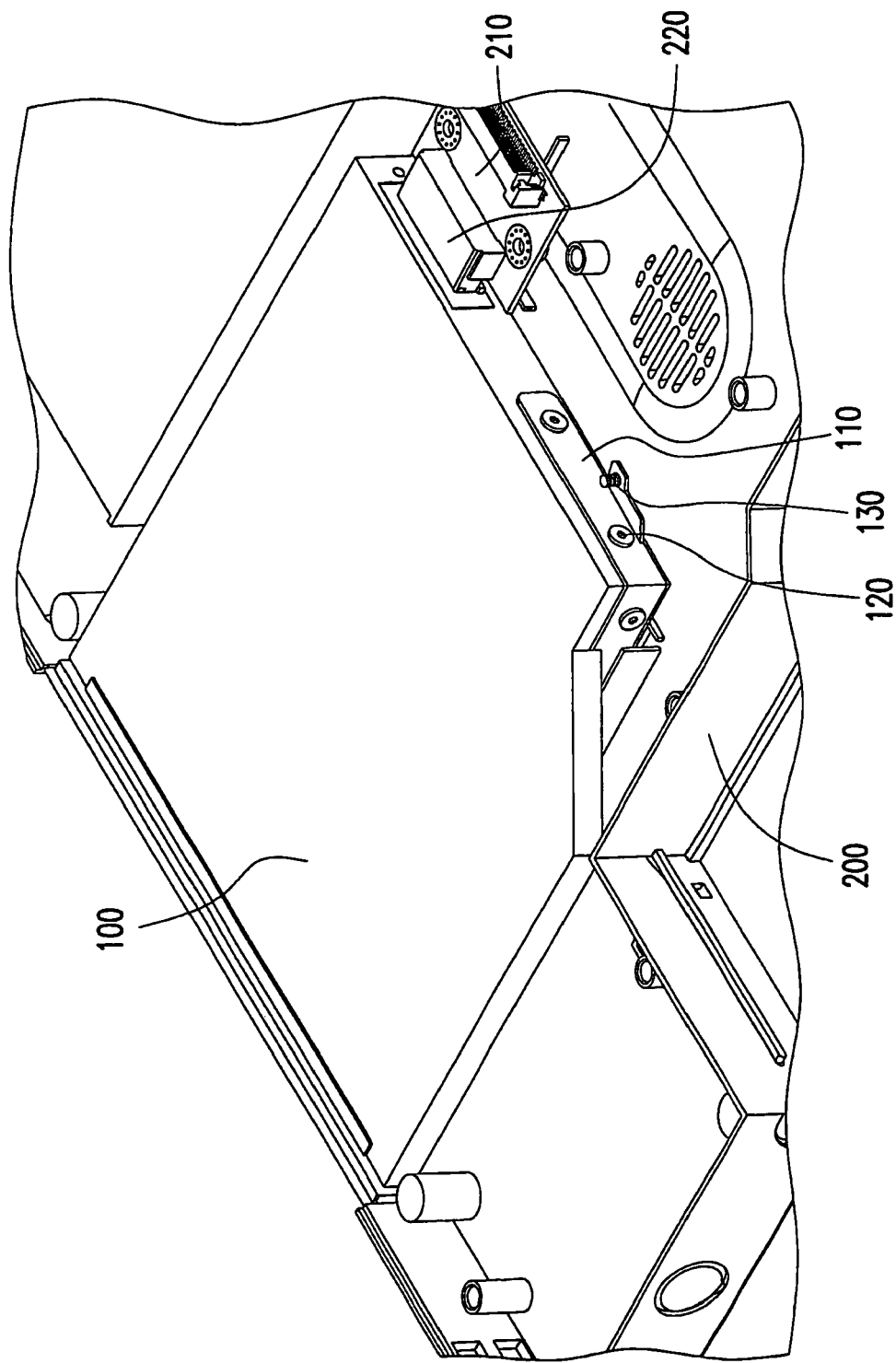
Figure 2A:
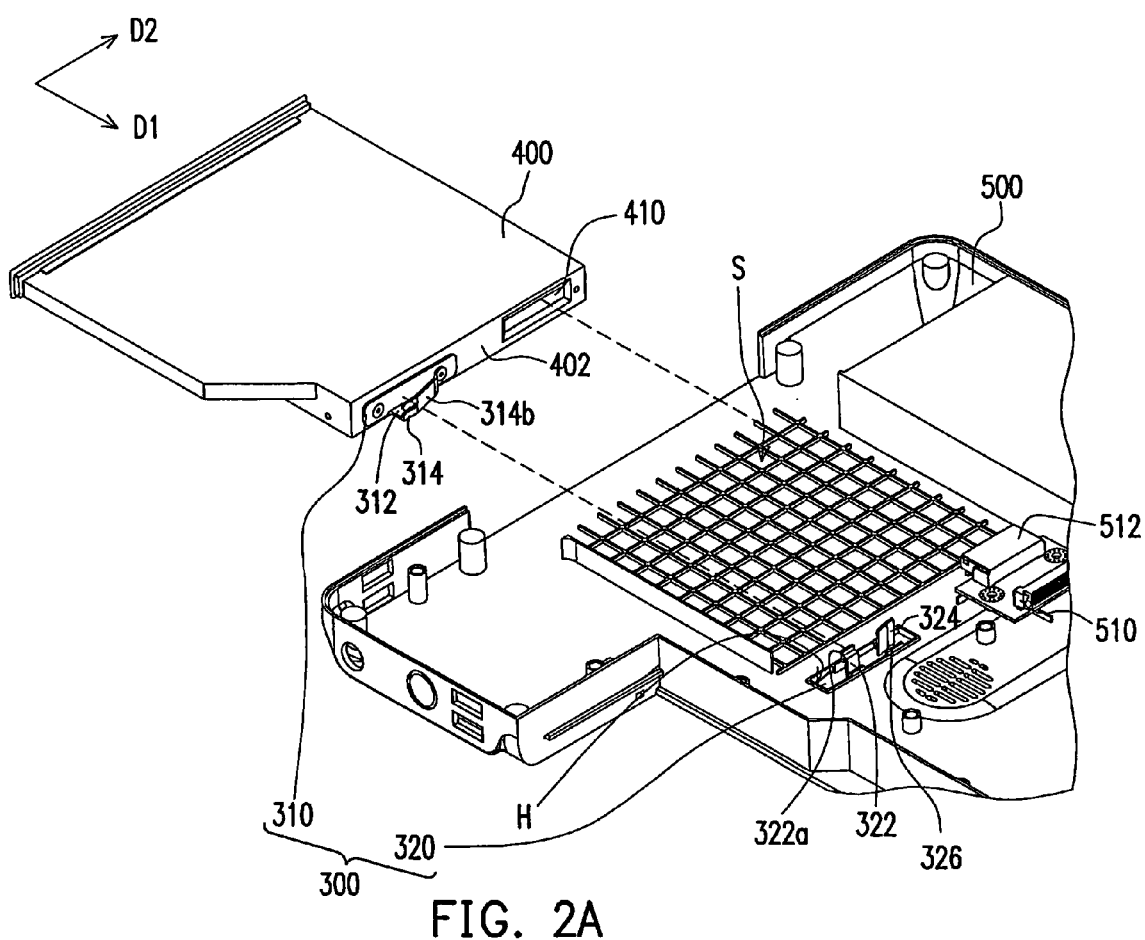
FIG. 2A is a three dimensional schematic diagram showing the assembling and disassembling mechanism for a data storage device when the data storage device is not assembled to the casing of the notebook according to an embodiment of the invention.
Figure 2B:
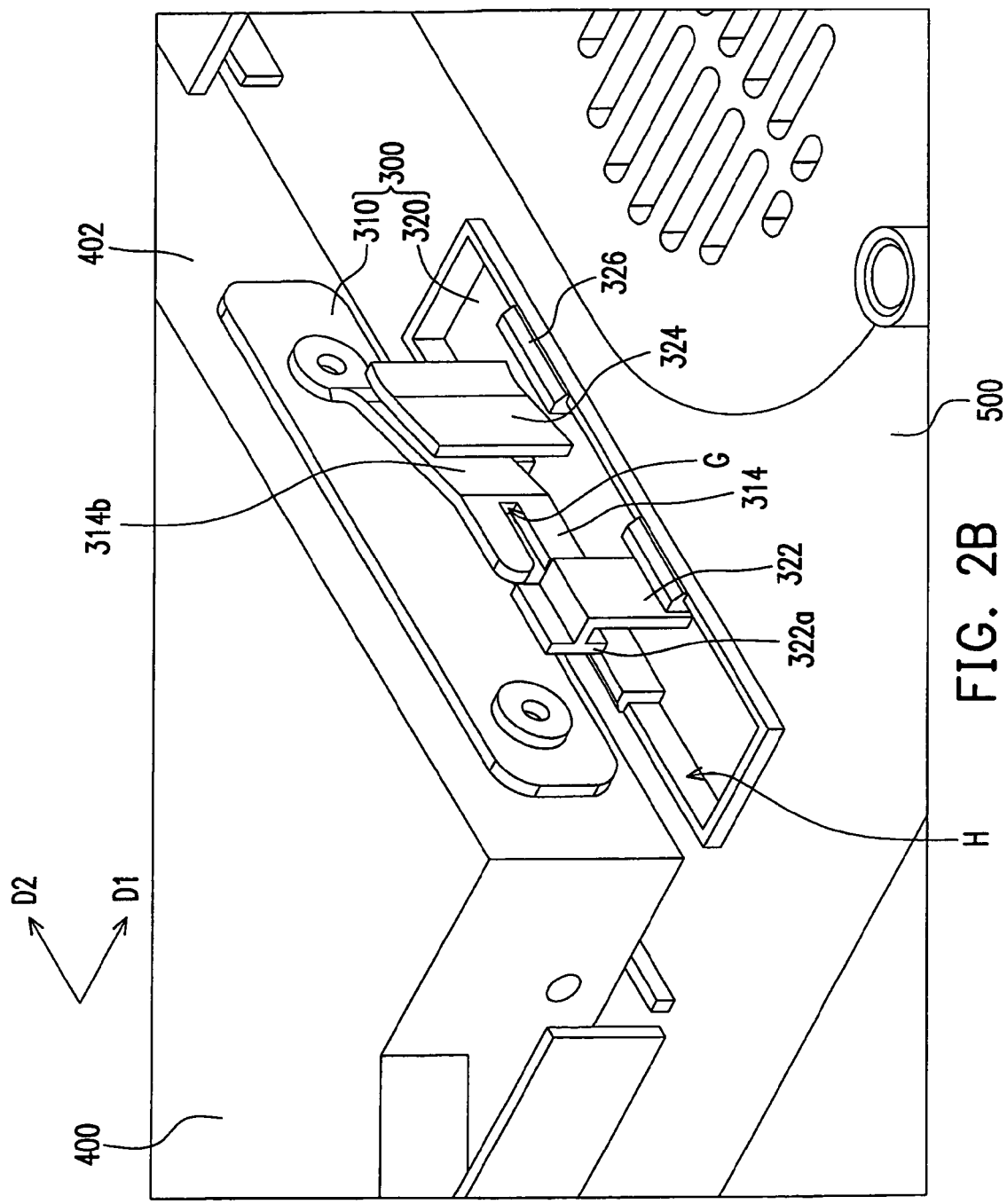
FIG. 2B is a three dimensional schematic diagram showing the assembling and disassembling mechanism shown in FIG. 2A when the data storage device is assembled to the casing of the notebook.
Figure 3A:
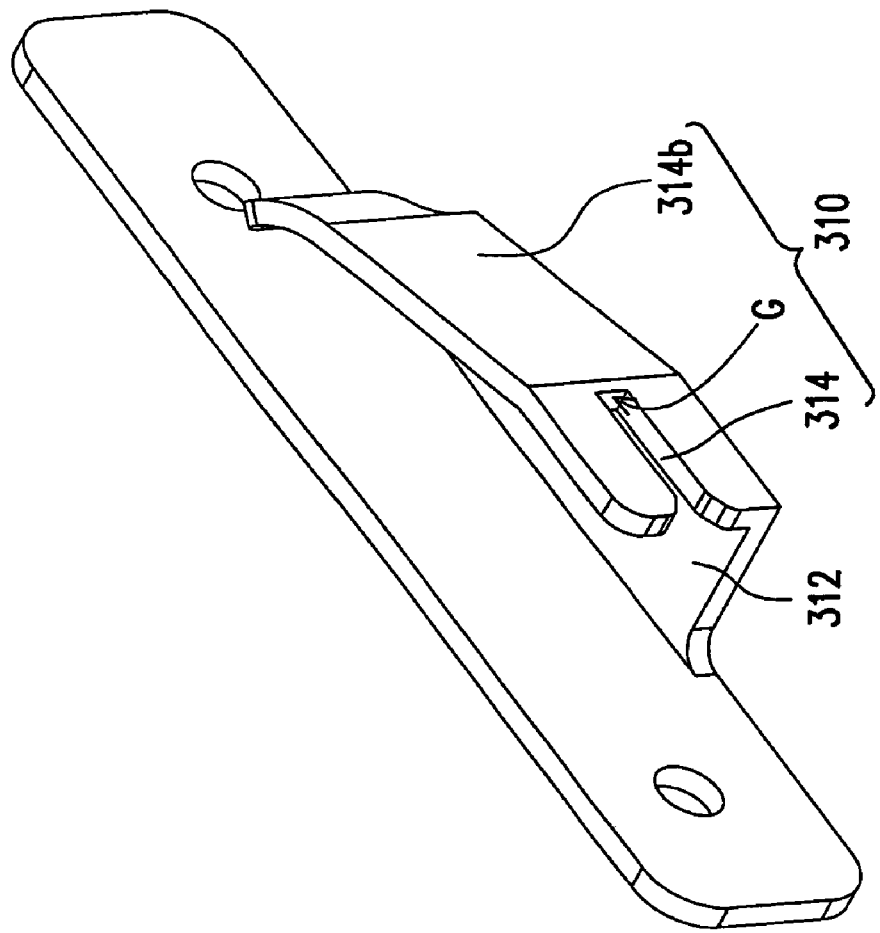
FIG. 3A is a three dimensional schematic diagram showing a fastener fixed to the data storage device shown in FIG. 2A.
Figure 3B:
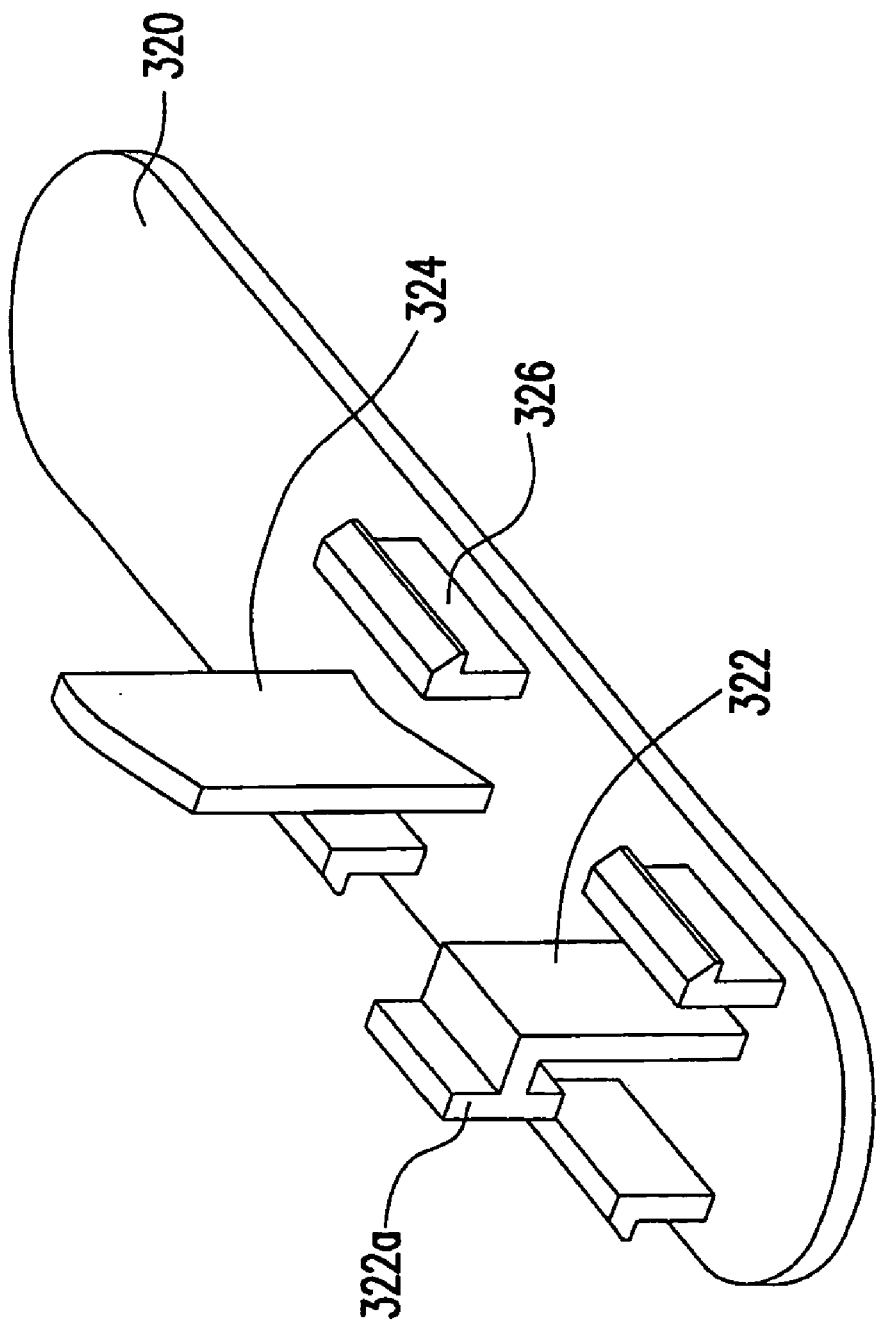
FIG. 3B is a three dimensional schematic diagram showing the push button in FIG. 2A.
Figure 4:
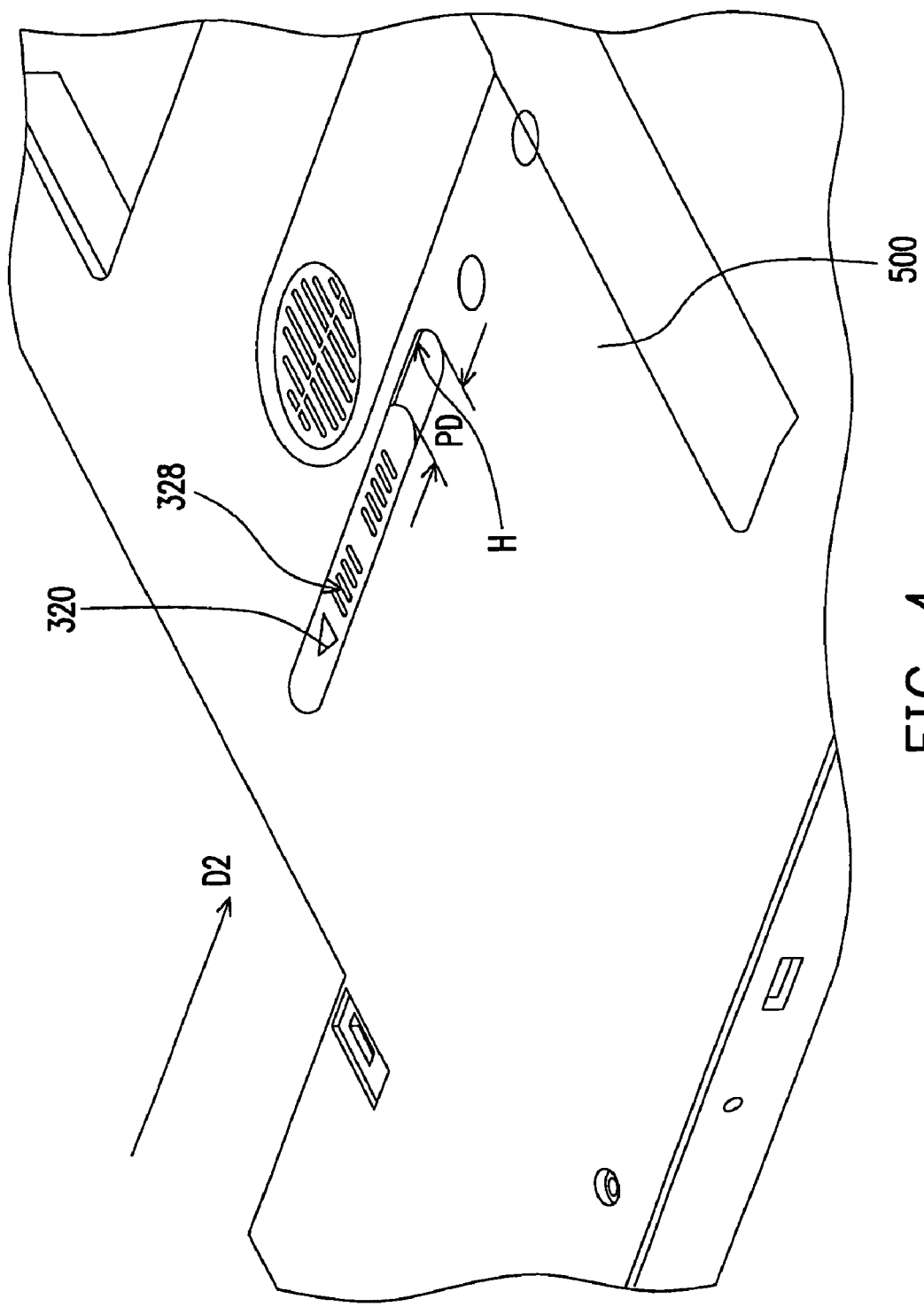
FIG. 4 is a schematic diagram showing the appearance of the push button shown in FIG. 3B assembles to the casing of the notebook.

FIG. 2A is a three dimensional schematic diagram showing the assembling and disassembling mechanism for a data storage device when the data storage device is not assembled to the casing of the notebook according to an embodiment of the invention; FIG. 2B is a three dimensional schematic diagram showing the assembling and disassembling mechanism shown in FIG. 2A when the data storage device is assembled to the casing of the notebook. FIG. 3A is a three dimensional schematic diagram showing a fastener fixed to the data storage device shown in FIG. 2A; FIG. 3B is a three dimensional schematic diagram showing the push button in FIG. 2A; FIG. 4 is a schematic diagram showing the appearance of the push button shown in FIG. 3B assembles to the casing of the notebook.

As shown in FIG. 2A to FIG. 4, the assembling and disassembling mechanism for a data storage device 300 of the embodiment is suitable to assemble a data storage device 400 to a casing 500 or disassemble the data storage device 400 from the casing 500. In the embodiment, the data storage device 400 is slidingly disposed on the casing 500 along a first sliding direction D1. Via the assembling and disassembling mechanism for a data storage device 300, the data storage device such as the floppy disc drive, the hard disc drive, the optical disc drive and the recorder may be assembled to or dissembled from the lower casing of the notebook.

The assembling and disassembling mechanism for a data storage device 300 includes a fastener 310 and a push button 320. The fastener 310 has a connecting portion 312 and a first fastening portion 314. The connecting portion 312 is fixed at the side wall 402 of the data storage device 400 and is connected to the first fastening portion 314. Furthermore, one end of the connecting portion 312 is connected to the side wall 402 of the data storage device 400, and the other end of the connecting portion 312 is connected to the first fastening portion 314. A distance is formed between the first fastening portion 314 and the side wall 402. In the embodiment, the fastener 310 is locked to side wall 402 of the data storage device 400. However, the fastener 310 also may be fixed to the data storage device 400 in other modes, and it is not limited. In the embodiment, the first fastening portion 314 is a fastening notch G. In addition, an oblique portion 314b is disposed at one side of the first fastening portion 314. Thus, the elements on the push button 320 may interfere with the oblique portion 314b to push the data storage device 400 outside the casing 500.

As shown in FIG. 4, the push button 320 is slidingly disposed in an opening H of the casing 500. Further, the push button 320 may slide by a predetermined distance PD along a second sliding direction D2 which is perpendicular to the first sliding direction D1 in substance. As shown in FIG. 2B and FIG. 3B, the push button 320 has a second fastening portion 322 and a pushing portion 324. The second fastening portion 322 is suitable to be fastened with the first fastening portion 314 to install the data storage device 400 in the casing 500. In the embodiment, the second fastening portion 322 is a hook 322a suitable to be fastened with the fastening notch G.

As shown in FIG. 3B, a plurality of sliding rails 326 may be disposed on the push button 320. The sliding rails 326 are set at the edge of the opening H. Therefore, the push button 320 may be slidingly disposed in the opening H of the casing 500 along the second sliding direction D2. In addition, as shown in FIG. 4, a plurality of protrudent ribs 328 may be selectively disposed on the surface of the push button 320 exposed from the casing 500 to allow a user to apply force to push the push button 320.

Figure 5A:
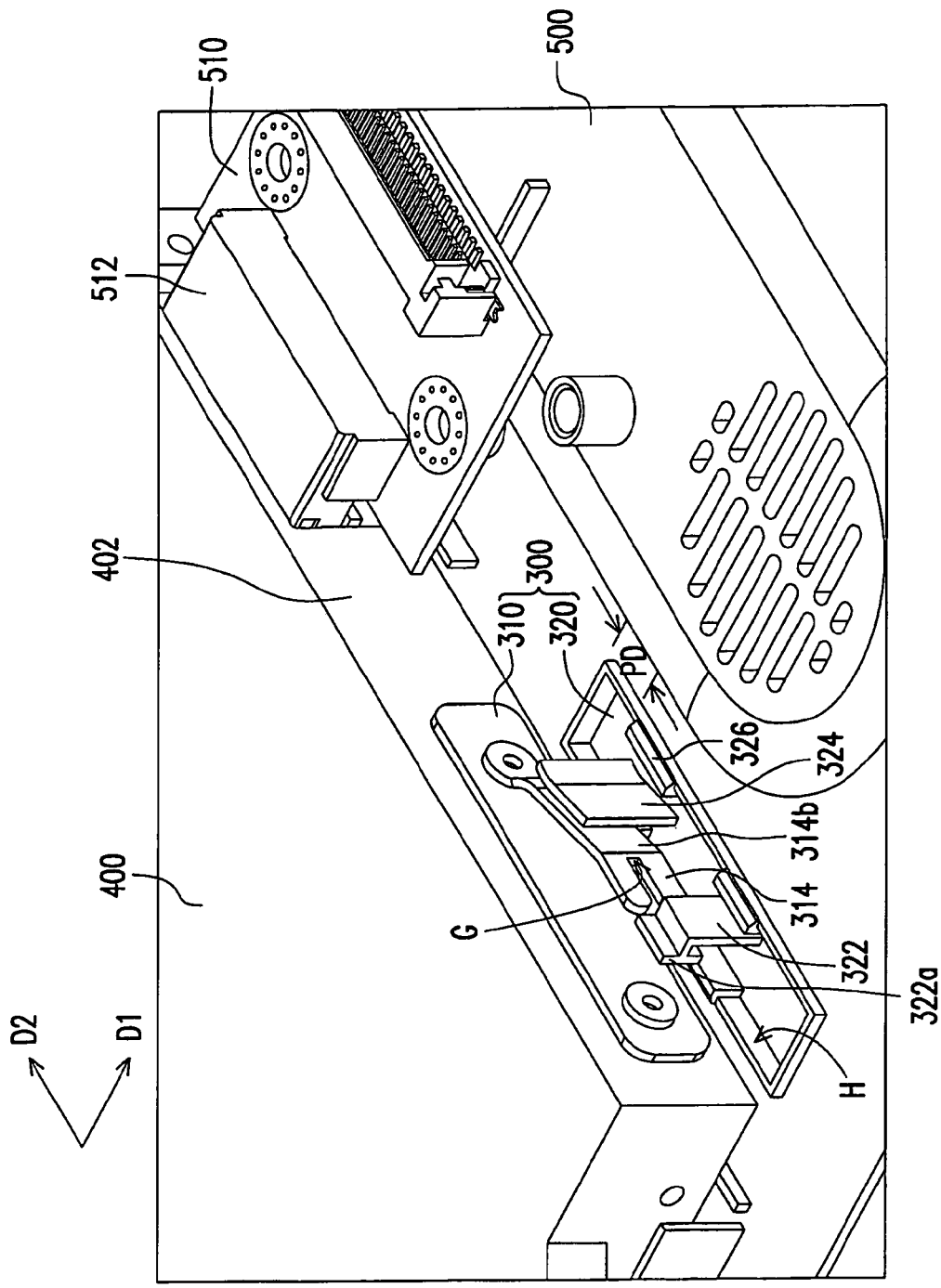
FIG. 5A and FIG. 5B are three-dimensional schematic diagrams showing the data storage device assembled to the casing via the assembling and disassembling mechanism according to the embodiment of the invention.
Figure 5B:
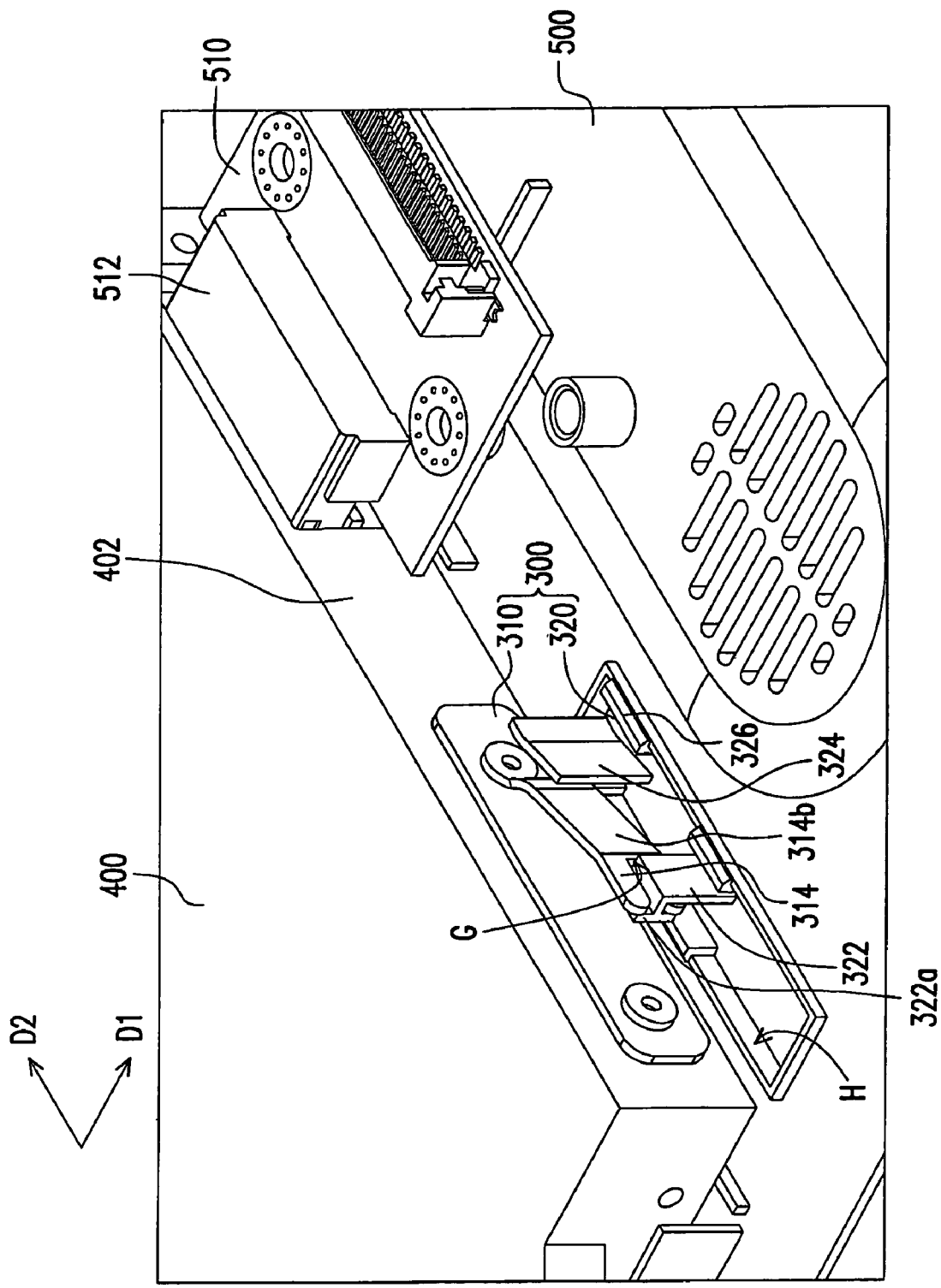

FIG. 5A and FIG. 5B are three-dimensional schematic diagrams showing data storage device assembled to the casing via the assembling and disassembling mechanism according to the embodiment of the invention. When the data storage device 400 needs to be assembled to the casing 500 of the notebook, as shown in FIG. 2A, the data storage device 400 is installed in a predetermined room S of the casing 500 along a first sliding direction D1, and then the connector 410 of the data storage device 400 is connected with the connector 512 of the circuit board 510 in the casing 500. At that moment, as shown in FIG. 5A, the push button 320 is in a release position, and the second fastening portion 322 is not fastened with the first fastening portion 314. Afterward, the push button 320 moves from the release position to the fixing position shown in FIG. 5B by a predetermined distance PD along the second sliding position D2. At that moment, the second fastening portion 322 is fastened with the first fastening portion 314, and the data storage device 400 is positioned.

Figure 5C:
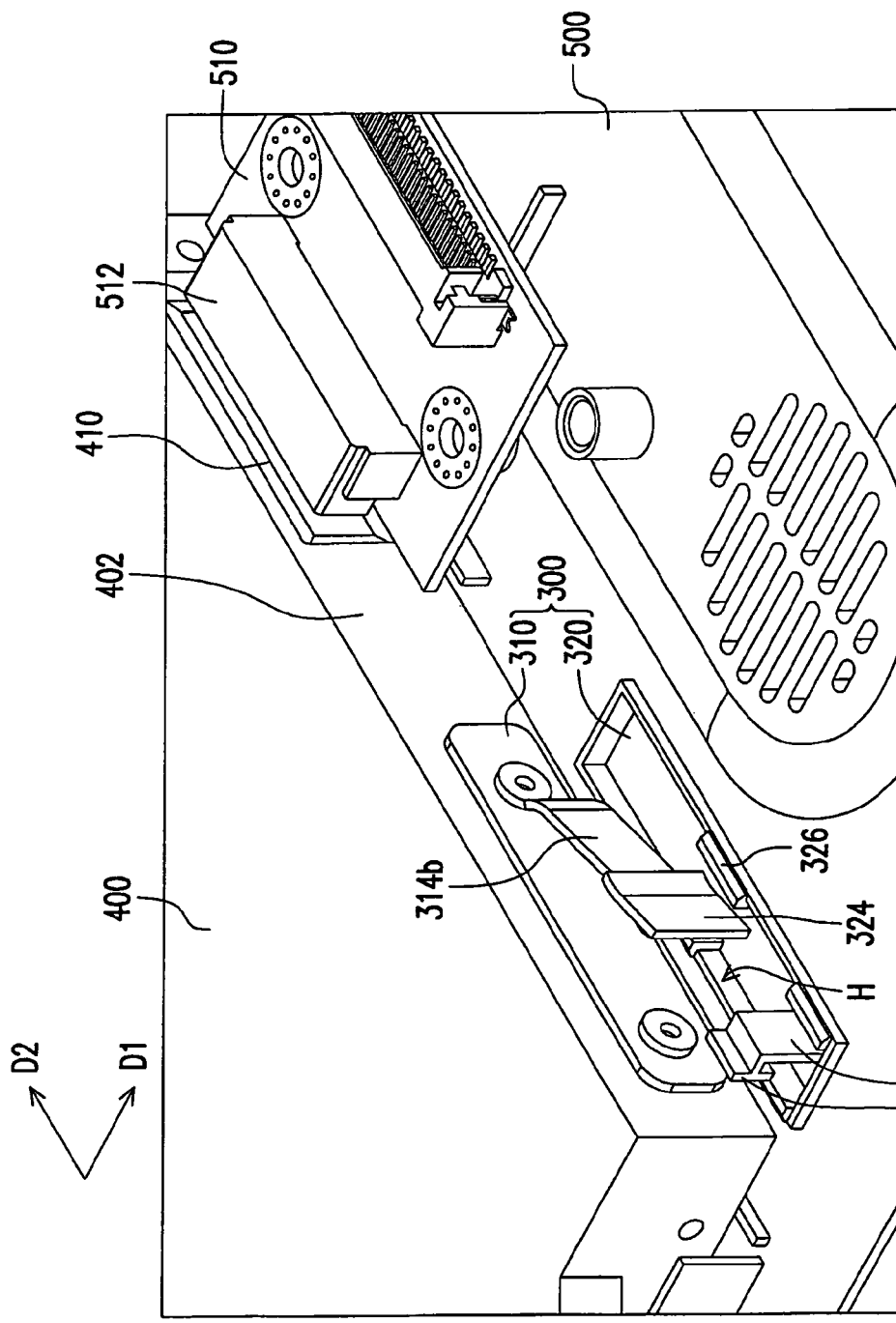
FIG. 5C is a three dimensional schematic diagram showing the data storage device disassembled from the casing.

On the contrary, when the data storage device 400 needs to be disassembled from the casing 500, as shown in FIG. 5C, a user pushes the push button 320 from the outside of the casing 500 to allow the push button 320 to slide by the predetermined distance PD along the negative direction of the second sliding direction D2. Thus, the push button 320 moves back to the release position from the fixing position. At that moment, the second fastening portion 322 is not fastened with the first fastening portion 314. In the sliding process of push button 320, the pushing portion 324 interferes with the oblique portion 314b and pushes the first fastening portion 314 to allow portion of the data storage device 400 to be protrudent from the casing 500. Thus, the connector 410 of the data storage device 400 is separated from the connector 512 of the circuit board 510. Thus, the data storage device 400 may be disassembled from the casing 500.

Figure 6:
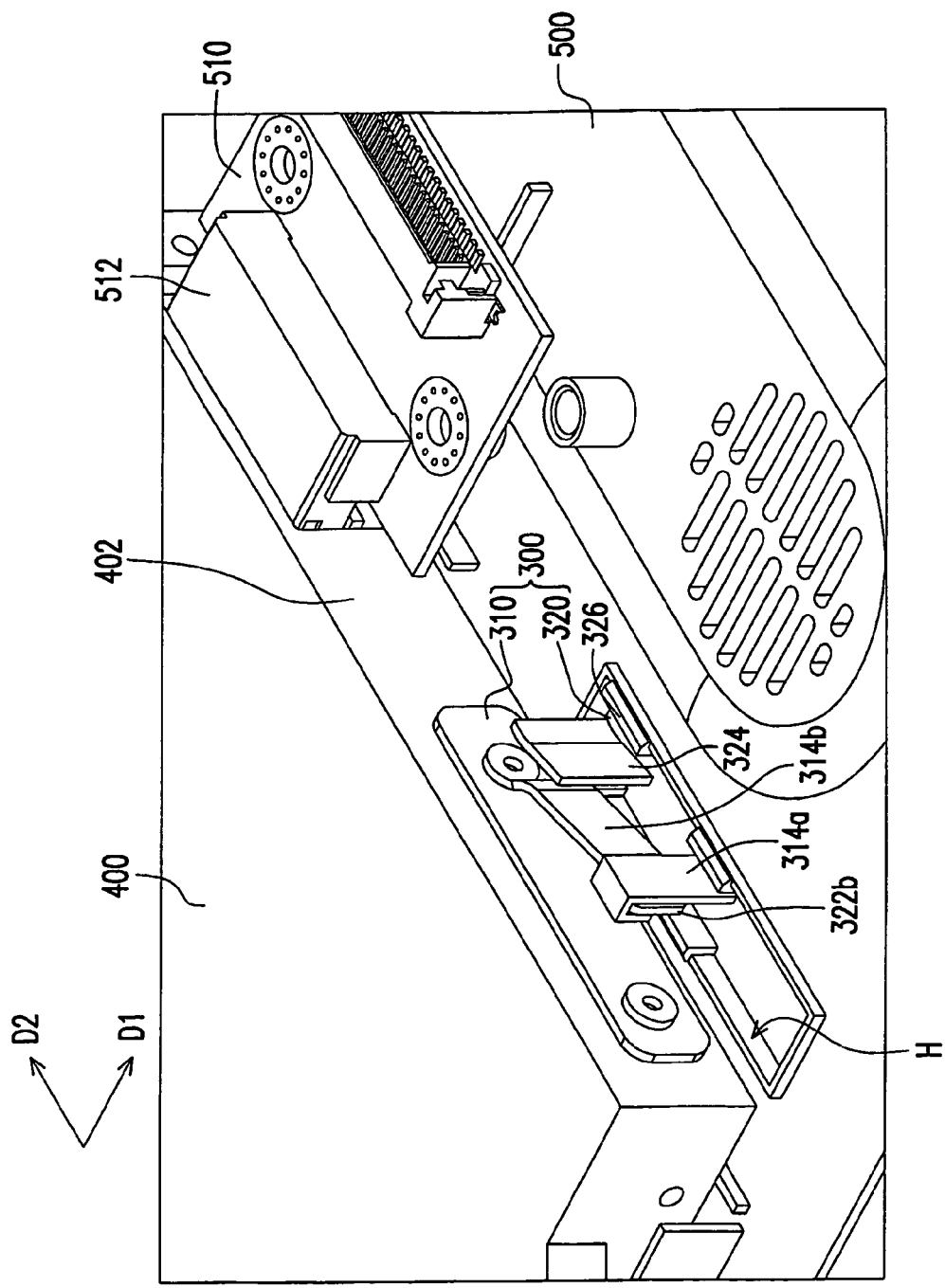
FIG. 6 is a three dimensional schematic diagram showing the first fastening portion and the second fastening portion in other mode.

In addition, besides the mode of fastening the fastening notch with the hook in the above embodiment, as shown in FIG. 6, the first fastening portion 314 and the second fastening portion 322 also may be a plate 314a and a hook 322b suitable to hook the edge of the plate 314a, respectively. Thus, the data storage device 400 also may be positioned. However, the first fastening portion 314 also may be fastened with the second fastening portion 322 in other modes to position the data storage device 400 in the casing 500, which is limited by the invention.

To sum up, for the assembling and disassembling mechanism for a data storage device of the invention, the fastener fixed to the data storage device is used to be fastened with the push button to fix the data storage device in the casing of the notebook. When the data storage device needs to be disassembled from the casing, the push button only needs to be pushed to release the fastening relationship between the data storage device and the push button. Thus, the pushing portion on the push button pushes the data storage device outside the casing, and the function of ejecting the data storage device is achieved easily. Thus, the data storage device may be assembled or disassembled without any tool to facilitate the assembly and disassembly of the data storage device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An assembling and disassembling mechanism for a data storage device adapted to assemble or disassemble a data storage device in a casing having an opening, the assembling and disassembling mechanism for a data storage device comprising:

a fastener having a connecting portion and a first fastening portion, wherein the connecting portion is fixed to the data storage device and is connected to the first fastening portion; and a push button slidingly disposed at the opening of the casing, wherein one portion of the push button is exposed form the opening, the push button is capable of sliding by a predetermined distance in the opening, the push button has a second fastening portion and a pushing portion which are disposed in the casing, the second fastening portion is adapted to be fastened with the first fastening portion to install the data storage device at the casing, and when the push button slides by the predetermined distance, it drives the second fastening portion to be separated from the first fastening portion, and the pushing portion pushes the first fastening portion to disassemble and push the data storage device.

2. The assembling and disassembling mechanism for a data storage device according to claim 1, wherein the data storage device is slidingly disposed at the casing along a first sliding direction.

3. The assembling and disassembling mechanism for a data storage device according to claim 2, wherein the push button slides by the predetermined distance along a second sliding direction which is perpendicular to the first sliding direction.

4. The assembling and disassembling mechanism for a data storage device according to claim 1, wherein the first fastening portion is a fastening notch, and the second fastening portion is a hook corresponding to the fastening notch.

5. The assembling and dissembling mechanism for a data storage device according to claim 1, wherein the first fastening portion is a plate, and the second fastening portion is a hook which is adapted to hook the edge of the plate.

6. The assembling and disassembling mechanism for a data storage device according to claim 1, wherein the first fastening portion has an oblique portion, and when the push button slides by the predetermined distance, the pushing portion pushes the oblique portion to push the data storage device.

7. The assembling and dissembling mechanism for a data storage device according to claim 1, wherein the push button further comprises a plurality of sliding rails corresponding to the edge of the opening to allow the push button to slide in the opening of the casing along the sliding rails.

8. The assembling and disassembling mechanism for a data storage device according to claim 1, wherein the portion of the push button exposed from the casing further comprises a plurality of protrudent ribs.

9. A notebook comprising:

a casing having an opening;

a data storage device which is adapted to be assembled and disassembled in the casing;

a fastener having a connecting portion and a first fastening portion, wherein the connecting portion is fixed at the data storage device and is connected to the first fastening portion; and a push button slidingly disposed at the opening of the casing, wherein one portion of the push button is exposed from the opening, the push button is capable of sliding by a predetermined distance in the opening, the push button has a second fastening portion and a pushing portion which are disposed in the casing, the second fastening portion is adapted to be fastened with the first fastening portion to install the data storage device in the casing, and when the push button slides by the predetermined distance, it drives the second fastening portion to be separated from the first fastening portion, and the pushing portion pushes the first fastening portion to disassemble and push the data storage device.

10. The notebook according to claim 9, wherein the data storage device is slidingly disposed at the casing along a first sliding direction.

11. The notebook according to claim 10, wherein the push button slides by the predetermined distance along a second sliding direction which is perpendicular to the first sliding direction.

12. The notebook according to claim 9, wherein the first fastening portion is a fastening notch, and the second fastening portion is a hook corresponding to the fastening notch.

13. The notebook according to claim 9, wherein the first fastening portion is a plate, and the second fastening portion is a hook which is adapted to hook the edge of the plate.

14. The notebook according to claim 9, wherein the first fastening portion has an oblique portion, and when the push button slides by the predetermined distance, the pushing portion pushes the oblique portion to push the data storage device.

15. The notebook according to claim 9, wherein the push button further comprises a plurality of sliding rails corresponding to the edge of the opening to allow the push button to slide in the opening of the casing along the sliding rails.

16. The notebook according to claim 9, wherein the portion of the push button exposed from the casing further comprises a plurality of protrudent ribs.

* * * * *